United States Patent Office 3,220,853
Patented Nov. 30, 1965

3,220,853
STABILIZED COLORED MARSHMALLOWS
Olga C. Golosinec, Chicago, and Edward S. Olney, Deerfield, Ill., assignors to National Dairy Products Corporation, New York, N.Y., a corporation of Delaware
No Drawing. Filed June 4, 1963, Ser. No. 285,227
7 Claims. (Cl. 99—134)

The present invention generally relates to an improved confection, and more particularly it relates to an improved non-sticky colored marshmallow and to the method of making such a marshmallow.

Marshmallows are conventionally made by whipping under gas pressure a mixture of sugars, gelatin and water, referred to herein as a marshmallow mix, to form a marshmallow foam. The whipped foam containing dispersed gas bubbles has been conventionally formed into cylinders, or similar shapes, by casting the foam in starch molds or has been formed by extrusion of the foam onto a belt and cutting by means of a reciprocating knife or the like, as disclosed in United States Patent No. 2,847,311.

In some instances it is desirable to provide marshmallows with a flavoring and/or coloring. Flavored and/or colored marshmallows are made by adding a suitable flavoring and/or coloring agent to a conventional white marshmallow mix. The marshmallows when cooled are usually provided with a flavoring agent, the color of the marshmallow indicating the flavor that has been added.

While flavored and colored marshmallows are highly desirable, they have had the disadvantage of becoming tacky or sticky, and, in many instances, flavored and colored marshmallows stick to one another upon storage.

It is, therefore, the principal object of the present invention to provide an improved confection. Another object is to provide a non-sticky marshmallow which contains a flavoring and/or coloring agent. A further object is to provide a method for manufacturing a non-sticky flavored and/or colored marshmallow.

Other objects and advantages of the present invention are more particularly set forth in the following description.

In general, the present invention generally comprises a method of manufacturing a non-sticky colored marshmallow which includes the step of adding to the coloring agent a suitable sequesterant, and the colored marshmallow product thereby produced.

The present invention comprises a colored marshmallow containing coloring agent and ethylene diamine tetra acetic acid (EDTA) or a salt of EDTA. More specifically, a marshmallow mix is provided in which a coloring agent is present and in which there is also present at least about 65 parts of a disodium salt of EDTA per million parts of marshmallow mix.

A conventional white marshmallow mix may be prepared by forming a syrup of a disaccharide, e.g., sucrose, a monosaccharide, e.g., glucose, water and starch. A marshmallow grade gelatin is dissolved in the mix and the mixture is passed into a beater where it is whipped with gas, such as air or nitrogen, to provide a marshmallow foam. The foam is then cast in conventional starch molds or is extruded. The finished marshmallows are covered with starch and are packaged. The method of preparing a white marshmallow mix is considered to be well known in the art, and need not be further described.

A suitable edible flavoring agent can be added to the white marshmallow mix in order to provide a flavored marshmallow product. The flavoring agents employed in the manufacture of flavored marshmallows are those flavoring agents which are conventionally employed in the food industry. The flavoring agents comprise edible oils and extracts, e.g., lemon oil, strawberry extract, and are usually employed in the form of concentrated oil-in-water emulsions. The flavoring agent is added to the white marshmallow mix in a concentration that is found to impart a suitable flavor to the marshmallows.

The white marshmallow mix can be colored by adding a coloring agent to the whipped marshmallow mix. In general, the coloring agents employed are water soluble, edible dyes that are normally used as food coloring agents. A list of some dyes is as follows:

Formula

Red #2 _____ $C_{20}H_{11}N_2O_{10}S_3Na_3$ (Sodium salt of 4-sulfo-2-naphthyl-azo-beta-naphthol-3,6 di-sulfonic acid. (Azo dye))

Red #4* _____ $C_{18}H_{14}N_2O_7S_2Na$ (Sodium salt of 5-sulfo-m-xylyl-azo-alpha-naphthol-4-sulfonic acid. (Azo dye))

Yellow #5 _____ $C_{16}H_9N_4O_9S_2Na_3$ (Sodium salt of 4-parasulfophenyl-azo-1-parasulfophenyl-5-hydroxy-pyrazole-3-carboxylic acid. (Pyrazolone dye))

Blue #1 _____ $C_{37}H_{34}N_2O_9S_3Na_2$ (Disodium salt of dibenzyl-thiethyl-diamino-triphenyl carbinol-trisulfonic-acid anhydride. (Triphenyl methane dye))

* Federal approval of Red #4 as an edible food coloring agent was withdrawn effective December 11, 1964, Fed. Reg., December 11, 1964, page 16983.

The above dyes can be combined with one another in differing amounts to provide variously colored marshmallows. The coloring agents are normally added to the white marshmallow mix in an amount from about 0.02 percent to about 0.03 percent by weight.

The coloring and/or flavoring agents are preferably added to the white marshmallow mix after it has been whipped and just prior to the casting of the foam in starch molds or the extrusion of the foam. In a conventional extrusion process the coloring and/or flavoring agent is added to the white marshmallow foam in a suitable mixer. The colored and/or flavored foam is passed out of the mixer directly into the exrusion apparatus. Alternately, the coloring and/or flavoring agent can be added to the white marshmallow mix at any point during the process.

Although it is known that colored and flavored marshmallows generally become sticky upon storage, it has not been known precisely what ingredients or factors contributes to this stickiness. Since marshmallows prepared from a white marshmallow mix whether or not flavored, are non-sticky under normal conditions, it is believed that the stickiness of colored marshmallows is due to the presence in the marshmallow foam of the coloring agent. In order to determine the cause of the stickiness of flavored and colored marshmallows, the following test is devised.

A simulated marshmallow foam, which closely approximates a conventional white marshmallow foam, is prepared from gelatin (marshmallow grade), a sodium metaphosphate solution and water. The simulated marshmallow foam has the following composition:

Gelatin _____grams__ 10.5
Sodium metaphosphate solution (4.2 grams of sodium metaphosphate dissolved in 1 liter of water) _____ml__ 50
Water _____ml__ 160

The gelatin is stirred into the cold sodium metaphosphate solution and is allowed to soak. The water is placed in a mixing bowl and heated to 180° F. and the gelatin and sodium metaphosphate solution is added thereto. The mixture is stirred until all the gelatin is dissolved in the water, and the mixture is cooled to 141° F. The mixture is then whipped with air for 10 minutes in a suitable beater to form a foam. The above described formulation produces a volume of simulated marshmallow foam that is considered to be equivalent to the volume of 1 pound of a conventional white marshmallow mix.

Samples of the above described simulated foam are placed in jars and stored for a period of 2 days at room temperature (e.g., 70° F.). After two days the control samples, containing no added coloring agent, have a uniform texture with small bubbles of air dispersed throughout the foam.

Similar samples of the simulated marshmallow foam are prepared containing coloring agents normally employed in the manufacture of colored marshmallows. Separate samples containing the flavoring agents alone, the coloring agents alone, and the combined flavoring and coloring agents are prepared and stored at room temperature for 2 days. In each instance the agents are added to the volume of simulated foam that is considered equivalent to a 1 pound white marshmallow mix. In this connection, when a flavoring agent is added to the simulated marshmallow mix, the mix is whipped for about 9 minutes, the flavor is added and the whipping is continued for a total of 10 minutes. When a coloring agent or a combined coloring and flavoring agent is added, the mix is whipped for 7 minutes, the color agent or combined coloring and flavoring agent is added, and whipping is continued for a total of 10 minutes.

The following combined coloring and flavoring agents are tested:

(1) Orange:
Red #2_____0.2 g.
Red #4_____0.8 g. } dissolved in 25 ml. water.
Yellow #5_____1.66 g.
Orange flavor_____25 ml.

Total_____50 ml.

(2) Lime:
Blue #1_____0.43 g. } dissolved in 31.5 ml. water.
Yellow #5_____2.23 g.
Lime flavor_____18.5 ml.

Total_____50 ml.

(3) Strawberry:
Red #2_____0.74 g. } dissolved in 40 ml. water.
Red #4_____1.1 g.
Strawberry flavor_____10 ml.

Total_____50 ml.

(4) Lemon:
Yellow #5_____1.67 g. dissolved in 30 ml. water.
Lemon flavor_____20 ml.

Total_____50 ml.

In each instance, 2.5 ml. of the 50 ml. mixture of the combined coloring and flavoring agent is added to the simulated marshmallow foam. The samples are then stored at room temperature for 2 days. In each instance, after storage for 2 days the simulated marshmallow foam containing both the flavoring and coloring agents have a non-uniform texture with large bubbles of air therein, and are not desirable when compared to the control samples.

To test the effect of the flavoring agents alone on the simulated marshmallow foam, the above amounts of each of the flavoring agents is diluted to 50 ml. with water and 2.5 ml. of each of the diluted flavoring agents is added to the above described 1 pound simulated marshmallow foam. After being stored at room temperature for 2 days, the samples containing only the flavoring agent are satisfactory. The simulated marshmallow foam is similar in texture and the size of the dispersed air bubbles to the control samples. It is determined that the stickiness in flavored and colored marshmallows is not due to the presence of the flavoring agent.

To test the effect of the coloring agent alone, the above amounts of each of the dyes is diluted to 50 ml. with water and 2.5 ml. of each of the diluted dyes is added to the 1 pound simulated marshmallow foam. After being stored for 2 days at room temperature, samples containing only the coloring agent contain large bubbles of air, and have a non-uniform texture. The samples containing only the coloring agent are considered to be unsatisfactory when compared to the control samples containing no coloring agent and no flavoring agent and to the samples containing only the flavoring agent.

The results of the experiments employing the simulated marshmallow foam indicate that the deleterious effect on the foam structure of colored and flavored marshmallows, and the resulting stickiness of the marshmallow product, is due to the presence of the coloring agent in the marshmallow mix. In order to further substantiate this conclusion, tests are run on various gelatins used in the manufacture of marshmallows to determine whether the different gelatins might have an effect on the marshmallow foam structure. The tests, which include electrophoretic patterns, fat analysis, surface tension, and the presence of non-ionic surfactants all indicate that the various gelatins are not significantly different from one another, and do not effect the foam structure of colored marshmallows.

The coloring agents employed in colored marshmallows are further tested in an attempt to determine what factors are involved in the destruction of the marshmallow foam. In this connection, the chromophore radical and the auxochrome radical of the coloring dyes are separated from each other and are incoporated in the simulated marshmallow mix in a manner similar to that previously described. After being stored at room temperature for a period of 2 days, the foam structure of the samples containing the separated dye radicals are not substantially different from the foam structure of the control samples. Therefore, it is believed that the foam structure is affected only when the dye components are present in the marshmallow foam in combined form as a complete dye molecule.

It is believed that the stickiness of the colored marshmallows is due to the structure of the particular coloring dyes employed. While it is not intended that the scope of the patent be limited by this theory, it is believed that the stickiness of colored marshmallows is caused by a reaction between the dye molecules and the gelatin.

Because the dyes usually employed as food coloring agents are anionic in nature and the gelatin is cationic, experiments were conducted in an attempt to complex the dye with a cationic material. Several cationic materials were employed, including egg white, Kraystay and whey proteins. An additional attempt to complex the dye was made by reacting the dye with gelatin at 40° C. The various complexed dyes are then formulated into a white marshmallow mix in an amount of about 0.02 to 0.03 percent by weight, and are stored for a period of one week. After storage, all of the samples are found to be sticky, indicating that complexing of the dye molecule is not sufficient to provide a non-sticky colored marshmallow.

A further attempt was made to prohibit the reaction between the dye molecule and the gelatin by sequestering the dye molecules. Several conventional phosphate sequestering agents, EDTA and various salts of EDTA were employed. The phosphate sequesterants tested include sodium acid pyrophosphate, anhydrous monocalcium phosphate, sodium hexametaphosphate and various mixtures of these phosphates. Colored marshmallow samples containing from about 0.02 percent to about 0.03 percent of the various dyes along with suitable amounts of the sequestering agents were prepared and stored for one week at room temperature.

After storage for one week, the only compounds which were found to prevent the stickiness of the colored marshmallows were EDTA and the EDTA salts. The disodium salt of EDTA was a particular compound that was found to prevent stickiness in the colored marshmallows. Further tests, employing various amounts of EDTA and EDTA salts showed that the best results are obtained when the EDTA or EDTA salt is present in an amount of at least about 100 p.p.m., but as low as 40 p.p.m. provides improved results. 100 p.p.m. disodium EDTA is found to provide non-sticky colored marshmallows regardless of the particular dye chosen. EDTA and other EDTA salts, such as the alkali metal salts, including tetra sodium EDTA, also act to prevent the stickiness of colored marshmallows and are considered to be equivalent to disodium EDTA. The level of EDTA is based upon the weight of the marshmallow mix. The term "marshmallow mix" as used herein includes those ingredients, including the flavoring and/or coloring agents, that are whipped to form the marshmallow foam.

*Example*

A conventional white marshmallow mix is prepared. In this connection, 2.25 pounds of water, 12.5 pounds of corn syrup (54 DE with about 81.5 percent solids), 10 pounds of dextrose and 22.5 pounds of sucrose are combined in a heated kettle. The kettle is heated to a temperature of 250° F. and 25 pounds of corn syrup (54 DE with about 81.5 percent solids) is added. The mixture is then cooled to 170° F.

In another kettle, 5 pounds of water is heated to about 170° F., and 2.5 pounds of gelatin (90 percent solids) having a Bloom value of about 250 is added to the water. The gelatin and water are agitated to hydrate the gelatin, and the hydrated gelatin is added to the sugar syrup described above. The mixture is cooled to 136° F. and introduced into a closed mixer. The white marshmallow mix is whipped in the mixer with nitrogen which is introduced into the mixture at a rate to provide an extruded product having a density of about 47 ounces per gallon. The whipping is carried out at a pressure of 60 p.s.i. and the whipped foam is discharged from the mixter at a temperature of about 150° F.

The while marshmallow foam is then introduced into a heat exchanger and cooled to about 107° F.

The white marshmallow mix is then divided into 9 samples. One sample, containing no added coloring or flavoring agent, is extruded to provide a white marshmallow control sample. The remaining samples are mixed with the coloring and flavoring agents in a suitable mixer and are extruded to provide colored and flavored marshmallows.

Two samples of each of the previously described combined coloring and flavoring agents are prepared. One sample is added to the white marshmallow mix as is. The other sample is mixed with the disodium salt of EDTA and is then added to the white marshmallow mix at levels to provide about 106 p.p.m. of the disodium salt of EDTA in the mix. In each instance, the combined coloring and flavoring agent is added at a level of about 2.5 ml. of solution per pound of white marshmallow mix. The coloring agent is present in an amount between 0.02 percent and 0.03 percent by weight of the marshmallow mix.

The marshmallow samples are stored at temperatures of 98° F. and 105° F. for a period of 8 weeks. At the end of this time there is no evidence of stickiness in either the white marshmallow control or in any of the colored and flavored marshmallows containing the EDTA salt. However, the colored marshmallow samples which do not contain the EDTA salt are in the form of a sticky mass and are unsuitable when compared to either the white marshmallow control sample or the colored marshmallows containing the coloring agent and the EDTA salt.

It can be seen that a method has been provided for producing colored marshmallows which overcomes objectionable stickiness in present colored marshmallows. Further, the invention provides a non-sticky colored marshmallow which has superior storage qualities when compared to conventional colored marshmallows. Additionally, a particular group of compounds have been shown to provide colored marshmallows with non-sticky characteristics when other agents considered to have like properties will not provide such a result. It is believed that EDTA and its salts react in some manner with the dye so that it does not change the properties of the gelatin. It is questioned whether the reaction comprises sequestration of the dye by the EDTA or the salts thereof.

Various of the features of the present invention are set forth in the following claims.

What is claimed is:

1. An improved non-sticky colored marshmallow comprising saccharides, gelatin, starch, moisture, an anionic food coloring dye and at least about 40 p.p.m. based on the weight of the marshmallow mix of a compound selected from the group consisting of ethylene diamine tetra acetic acid and the salts of ethylene diamine tetra acetic acid.

2. An improved non-sticky colored marshmallow comprising saccharides, gelatin, starch, moisture, an anionic food coloring dye and at least about 40 p.p.m. based on the weight of the marshmallow mix of an ethylene diamine tetra acetic acid salt.

3. An improved non-sticky colored marshmallow comprising saccharides, gelatin, starch, moisture, an anionic food coloring dye, and at least about 65 p.p.m. based on the weight of the marshmallow mix of an ethylene diamine tetra acetic acid salt.

4. An improved non-sticky colored marshmallow comprising saccharides, gelatin, starch, moisture, a flavoring agent, from about 0.02 percent to 0.03 percent of an anionic food coloring dye, and about 65 p.p.m. based on the weight of the marshmallow mix of the disodium salt of ethylene diamine tetra acetic acid.

5. In the method of making colored marshmallows which includes adding an anionic food coloring dye to a marshmallow mix and forming the colored mix into marshmallows, the improvement comprising mixing a sufficient amount of a compound selected from the group consisting of ethylene diamine tetra acetic acid and salts of ethylene diamine tetra acetic acid with the anionic dye prior to adding the anionic dye to the mix in order to provide a colored mix containing at least about 40 p.p.m. by weight of said compound, whereby non-sticky colored marshmallows are provided.

6. In the method of making colored marshmallows which includes adding an anionic food coloring dye to a marshmallow mix and forming the colored mix into marshmallows, the improvement comprising mixing a sufficient amount of a compound selected from the group consisting of ethylene diamine tetra acetic acid and salts of ethylene diamine tetra acetic acid with the anionic dye prior to adding the anionic dye to the mix in order to provide a colored mix containing at least about 100 p.p.m. by weight of said compound, whereby non-sticky colored marshmallows are provided.

7. In the method of making colored marshmallows which includes adding an anionic food coloring dye to a marshmallow mix and forming the colored mix into marshmallows, the improvement comprising mixing the anionic dye with sufficient disodium ethylene diamine tetra acetic acid prior to adding the anionic die to the mix to provide a marshmallow mix comprising at least about 65 p.p.m. of said acid, whereby non-sticky colored marshmallows are provided.

References Cited by the Examiner

UNITED STATES PATENTS 2,841,499  7/1958  Grossi _____ 99—148
3,108,003  10/1963  Powers _____ 99—148

OTHER REFERENCES

Whymper, "The Manufacture of Confectionery," 1923, The St. Catherine Press, London, England.

A. LOUIS MONACELL, *Primary Examiner.*